(12) United States Patent
Yokota

(10) Patent No.: US 6,503,157 B2
(45) Date of Patent: Jan. 7, 2003

(54) GOLF BALL AND PROCESS FOR MANUFACTURING THE SAME

(75) Inventor: Masatoshi Yokota, Kobe (JP)

(73) Assignee: Sumitomo Rubber Industries Limited, Hyogo (JP)

( * ) Notice: Subject to any disclaimer, the term of this patent is extended or adjusted under 35 U.S.C. 154(b) by 0 days.

(21) Appl. No.: 09/899,106

(22) Filed: Jul. 6, 2001

(65) Prior Publication Data

US 2002/0019272 A1 Feb. 14, 2002

(30) Foreign Application Priority Data

Jul. 6, 2000 (JP) .................................... 2000-205400

(51) Int. Cl.[7] .................. A63B 37/12; A63B 37/14; A63B 37/06; A63B 37/00; C08F 283/04
(52) U.S. Cl. .................. 473/378; 473/365; 473/351; 525/420
(58) Field of Search ................ 473/351–377; 525/420

(56) References Cited

U.S. PATENT DOCUMENTS

| 3,130,102 | A | | 4/1964 | Dunlop |
| 3,989,568 | A | | 11/1976 | Isaac |
| 4,123,061 | A | | 10/1978 | Dusbiber |
| 4,884,814 | A | | 12/1989 | Sullivan |
| 5,334,673 | A | | 8/1994 | Wu |
| 6,042,768 | A | * | 3/2000 | Calabria et al. ............ 264/135 |
| 6,309,313 | B1 | * | 10/2001 | Peter ...................... 264/271.1 |
| 6,371,870 | B1 | * | 4/2002 | Calabria et al. ........... 473/370 |

* cited by examiner

Primary Examiner—Sebastiano Passaniti
Assistant Examiner—Alvin A. Hunter
(74) Attorney, Agent, or Firm—Birch, Stewart Kolasch & Birch, LLP

(57) ABSTRACT

The present invention provides an improved golf ball with a polyurethane cover, and a process therefor. The invention is characterized in using the complex of polyamine compound with a metal salt as a curing agent, which releases the polyamine compounds above the specific temperature.

20 Claims, No Drawings

GOLF BALL AND PROCESS FOR MANUFACTURING THE SAME

BACKGROUND OF THE INVENTION

1. Field of the Invention

The present invention relates to a golf ball having a polyurethane cover and a process for manufacturing the same.

2. Description of the Related Art

A wound golf ball having a "Balata" cover is widely used by high-level golfers and professional golfers, because Balata cover is superior in feel and control. Herein, "feel" is the overall sensation to the golfer when the golf ball is hit and "control" is to impart the motion such as back spin to the golf ball. However, the golf ball having a Balata cover is expensive due to a complicated manufacturing process and is inferior in durability and cut resistance.

For this reason, various cover stocks have recently been proposed in an attempt to replace the Balata cover.

For instance, a golf ball having an ionomer resin is disclosed in Japanese Unexamined Patent Application No.H01-308577. The ionomer resin cover is less expensive and has a superior durability than the Balata cover. However, it is pointed out that the ionomer resin cover is poor in feel.

U.S. Pat. No. 4,123,061 discloses a polyurethane cover formed by using a urethane prepolymer and a diamine curing agent. Japanese Examined Patent Application No. 2,662,909 also discloses a polyurethane cover formed by using a polyamine curing agent having a lower reactivity with an isocyanate group. Polyurethane cover generally has a higher impact resilience than the ionomer resin cover and has the good feel such as the Balata cover. However, in the process for manufacturing a golf ball having a polyurethane cover, there are various problems associated with the curing reaction.

The diamine curing agent disclosed by U.S. Pat. No. 4,123,061 has too high reactivity with the isocyanate group of a polyurethane prepolymer, hence the curing reaction proceeds even at the room temperature (not higher than 25° C.).

Therefore, it is difficult to prevent an increase in viscosity and gelation due to the curing reaction during mixing the polyurethane prepolymer with the diamine curing agent.

3,3'-dichloro-4,4'-diaminodiphenylmethane is disclosed as the typical amine-type curing agent in U.S. Pat. No. 4,123,061, which is preferably used as a curing agent for polyurethane polymer because the resulting polyurethane polymer exhibits excellent performance. However, 3,3'-dichloro-4,4'-diaminodiphenylmethane has the melting point of about 100° C., thus this curing agent usually needs to be melted by heating at 100° C. or higher temperature prior to use. Heating the curing agent such a high temperature causes the generation of the toxic vapor which pollutes the working place as well as promotes the curing reaction during mixing the polyurethane prepolymer with the curing agent.

In the case of a liquid diamine curing agent which can be mixed with a polyurethane prepolymer at a low temperature, it is still difficult to prevent an increase in viscosity and gelation due to the curing reaction proceeding during mixing. In addition, the resulting polyurethane polymer exhibits the poor physical properties than the polyurethane polymer using 3,3'-dichloro-4,4'-diaminodiphenylmethane.

If the polyamine curing agent having low reactivity disclosed in Japanese Patent No. 2,662,909 is used in an attempt to overcome the above problems, it is inevitable that the curing time becomes longer, which results in lowering the productivity. When the curing temperature is raised to shorten the curing time, there arises another problem that the rubber core of the golf ball is deteriorated by heat, resulting in the poor performance of the golf ball.

SUMMARY OF THE INVENTION

It is an object of the present invention to provide a golf ball and a process therefor, which overcome the foregoing problems raised in forming a cover by curing a polyurethane prepolymer.

The present invention provides a process for manufacturing a golf ball having a core and a cover covering the core, comprising;

coating the core with a composition including a complex of a polyamine compound with a metal salt, and an isocyanate group terminated polyurethane prepolymer; and curing the composition to form the cover.

The present invention further provides a golf ball comprising a core, and a polyurethane cover covering the core, wherein the polyurethane cover is formed by curing a composition including an isocyanate group terminated polyurethane prepolymer; and a complex of a polyamine compound with a metal salt.

These and other objects, features and attendant advantages of the present invention will become apparent from the reading of the following detailed description.

DETAILED DESCRIPTION OF THE PREFERRED EMBODIMENTS

The process of the invention comprises coating the core with a composition including a complex of a polyamine compound with a metal salt, and an isocyanate group terminated polyurethane prepolymer; and curing the composition to form the cover.

First of all, the composition including the isocyanate group terminated polyurethane prepolymer and the complex of a polyamine compound with a metal salt will be explained. Hereinafter, the composition is referred to as "cover stock composition".

I. Isocyanate Group Terminated Polyurethane

The isocyanate group terminated polyurethane prepolymer used for the cover stock composition is not limited, as long as it has at least two isocyanate groups in a polyurethane prepolymer molecular chain. The location of each isocyanate group in a polyurethane prepolymer molecular chain is not particularly limited. The isocyanate group may be located at the terminal of the backbone chain or side chain of a polyurethane prepolymer molecular chain.

The isocyanate group terminated polyurethane prepolymer can be obtained by reacting polyisocyanate compound with a polyol so that isocyanate group of a polyisocyanate compound is at least stoichiometric quantity of the hydroxyl group of a polyol in molar ratio.

Polyisocyanate compound includes, without limitation, for example, 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 4,4'-dicyclohexylmethane diisocyanate (hydrogenated MDI), hexamethylene diisocyanate (HDI), 1,5-naphthylene diisocyanate (NDI), 3,3'-bitoluene-4,4'-diisocyanate (TODI), isophorone diisocyanate (IPDI), paraphenylene diisocyanate (PPDI), and xylene diisocyanate (XDI). In view of the impact resilience of an intended golf ball and the workability in manufacture, TDI and MDI, or a polyisocyanate compound including TDI or MDI as a major component are preferred.

Any polyol having a plurality of hydroxyl groups may be used in the present invention, for example, low molecular weight polyol and high molecular weight polyol may be used.
Low molecular weight polyol includes, for example, diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. High molecular weight polyol includes, for example, polyether polyol obtained by the reaction between an initiator having active hydrogen and alkylene oxide; polyester polyol obtained by the condensation between a dibasic acid such as adipic acid and a glycol or a triol; lactone polyester polyol obtained by the ring-opening polymerization of a lactone such as ε-caprolactone; polycarbonate diol generally synthesized using a cyclic diol; and polymer polyol such as an acrylic polyol prepared by introducing a hydroxyl group into an acrylic copolymer.
Examples of polyether polyol are, without limitation, polyoxyethylene glycol, polyoxypropylene glycol (PPG), and polyoxytetramethylene glycol (PTMG). Examples of polyester polyol are, without limitation, polyethylene adipate (PEA), polybutylene adipate (PBA), and polyhexamethylene adipate (PHMA). Examples of such lactone polyester polyols include poly-ε-caprolactone (PCL). In view of their superior impact resilience and water resistance, polyether polyol is preferable. Especially, polyoxytetramethylene glycol is more preferable.

The preferable combination of the polyisocyanate and the polyol for the isocyanate terminated polyurethane prepolymer is the combination of TDI or MDI, or a polyisocyanate compound including TDI or MDI as a major component and polyoxytetramethylene glycol.

II. Complex of a Polyamine Compound with a Metal Salt

The complex of a polyamine compound with a metal salt used for the cover stock composition is characterized in that the polyamine compound forms the complex with the metal salt, hence the amino group thereof is inactive below a specific temperature. However, when the complex is heated above the specific temperature, the complex releases the polyamine compound, which is reactive to the isocyanate group.

Thus, the problems existing in the prior art such as an increase in viscosity and gelation of the cover stock composition can be overcome by mixing the complex with the isocyanated terminated polyurethane prepolymer below the specific temperature.

Examples of polyamine compound for use in the complex are, without limitation, alkylene diamines such as ethylene diamine, propylene diamine, butylene diamine, pentane diamine, and hexamethylene diamine; aromatic amines such as toluene diamine, methylene dianiline, and xylylene diamine; alicyclic or heterocyclic amines such as isophorone diamine and piperazine; amino-alcohols such as ethanolamine and diethanolamine; and hydrazine or derivatives thereof. In view of the stability of the complex, methylene dianiline and/or derivatives thereof are preferable. Examples of specific derivatives of methylene dianiline are, without limitation, halogenated diaminodiphenylmethanes such as 3,3'-dichloro-4,4'-diaminodiphenylmethane, and 2,2',3,3'-tetrachloro-4,4'-diaminodiphenylmethane; dialkyldiaminodiphenylmethanes such as 2,2'-dimethyl-4,4'-diaminodiphenylmethane, and 2,2'-diethyl-4,4'-diaminodiphenylmethane; and tetraalkyldiaminodiphenylmethanes such as 2,2',3,3'-tetramethyl-4,4'-diaminodiphenylmethane, and 2,2',3,3'-tetraethyl-4,4'-diaminodiphenylmethane.

Examples of metal salt for use in the complex are, without limitation, alkali metal salts such as of lithium, sodium, and potassium; alkali earth metal salts such as of magnesium, calcium, and strontium; and transition metal salts such as of chromium, iron, cobalt, copper, and zinc. Among them, alkali metal salts are preferable. Examples of specific alkali metal salts are sodium chloride, sodium bromide, sodium iodide, sodium nitrite, lithium chloride, lithium bromide, lithium iodide, lithium nitrite, and sodium cyanide. Sodium chloride or lithium chloride is more preferable among them.

In view of the stability of the complex, the ratio of the polyamine compound to the metal salt in the complex is preferably 3 mole to 1 mole.

The complex is preferably dispersed in a disperse medium for use in curing the isocyanate terminated polyurethane prepolymer. Use of a dispersion of the complex does not only allow the complex to be dispersed homogeneously into the isocyanate group terminated prepolymer but also enable to lower the mixing temperature. Examples of a disperse media are, without limitation, solvents such as ethyl acetate, methyl ethyl ketone, N,N-dimethylformamide, dimethyl sulfoxide, tetrahydrofuran, toluene, xylene, and N-methylpyrrolidone; and plasticizer including phthalate-type plasticizer such as dibutyl phthalate (DBP) and dioctyl phthalate (DOP), adipate-type plasticizer such as dioctyl adipate (DOA), sebacate-type plasticizer such as dioctyl sebacate (DOS), phosphate-type plasticizers such as tricresyl phosphate (TCP), and adipic acid-type polyesters. Among them, dioctyl phthalate is most preferable as the disperse medium because it has a higher ability to allow the complex to be dispersed homogeneously into the isocyanate group terminated polyurethane prepolymer even at a lower temperature.

The temperature where the complex releases the polyamine compounds depends on the combination of the polyamine compound and the metal salt. Among combinations of the aforementioned polyamine compounds and the aforementioned metal salts, the preferable combination is such that the complex releases the polyamine compound at the temperature over 60° C.

As an example of such a combination, the complex of methylene dianiline with sodium chloride releases methylenedianiline at the temperature over 60° C.

50 wt % dioctyl phthalate dispersion of the complex of methylene dianiline and sodium chloride (methylene dianiline:sodium chloride=3:1 in molar ratio) is commercially available from UNIROYAL Co.Ltd.

The cover stock composition may further include a low molecular weight polyol in combination with the above the complex-type curing agent. Examples of a low molecular weight polyol are diols such as ethylene glycol, diethylene glycol, triethylene glycol, 1,3-butanediol, 1,4-butanediol, neopentyl glycol, and 1,6-hexanediol; and triols such as glycerin, trimethylolpropane, and hexanetriol. Use of such a low molecular weight polyol in combination with the complex type curing agent enables to lower the temperature where the complex release the polyamine compound.

The cover stock composition used in the present invention may further contain a filler such as barium sulfate, a pigment such as titanium dioxide, and other additives such as a dispersant, an antioxidant, an ultraviolet absorber, a light stabilizer, and a fluorescent material or a fluorescent brightening agent, as long as they do not impair undesired property to the intended golf ball.

III. Core

In the present invention, the core does not have any limitation on its structure. Examples of such structure are a single core, a multi-layered core, and a wound core formed by winding rubber thread about the single-layered core or multi-layered core.

The core also does not have any limitation on its composition and may be made from well known material used for the core of the golf ball.

Examples of such core material are rubbers such as butadiene rubber (BR), natural rubber (NR), ethylene-propylene-diene terpolymer (EPDM), and polynorbornene; thermoplastic resins; and thermoplastic elastomer. The core may further contain an oily substance such as a petroleum compounding oil that is compatible with the aforementioned rubbers, a plasticizer, a rubber substitute (factice), alkylbenzene, or a liquid rubber; a filler such as barium sulfate or tungsten; an antioxidant; and a vulcanizing agent such as sulfur, zinc oxide, stearic acid, zinc stearate, an organic peroxide (for example, dicumyl peroxide, 1,1-di-t-butylperoxy-3,3,5-trimethylcyclohexane, or the like).

IV. Mixing Process

The process of the invention includes coating the core with the cover stock composition, and curing the cover stock composition to form the cover.

The process of the invention may further include mixing the isocyanate terminated polyurethane prepolymer and the complex to obtain the cover stock composition, ahead of coating the cover stock composition.

Mixing of the cover stock composition is carried out at the temperature below the temperature which allows the complex to release the polyamine compound. Preferably, mixing is carried out at the temperature not higher than 60° C., more preferably not higher than 50° C., and not lower than 10° C., more preferably not lower than 20° C. Working operation at a lower temperature is preferable from the view point of safety. In addition, if mixing is carried out at the temperature over 60° C., the cover stock composition will generate the highly toxic vapor of the isocyanate group terminated polyurethane prepolymer.

If mixing is carried out at the temperature lower than 10° C., the viscosity of the isocyanate group terminated polyurethane prepolymer becomes too high, hence it is difficult to mix the cover stock composition homogeneously.

Since the curing reaction of the cover stock composition is inhibited at a temperature below the temperature which allows the complex to release the polyamine compound, an increase in viscosity or gelation of the cover stock composition with time will not occur. Accordingly, it is possible to coat the core with the cover stock composition subsequently to mixing the cover stock composition, or to store the cover stock composition for a while and then coat the core with the cover stock composition when required.

The mixing can be conducted by using a mixer typically used for a polyurethane prepolymer, for example, a typical two-part resin mixing dispenser.

V. Coating and Curing Process

Method of coating the core with the cover stock composition is not limited. For example, the cover stock composition is injected into a hemispherical mold in which the core is held, and then the mold is inverted and mated with another hemispherical mold into which the cover stock composition has been injected, followed by curing.

Curing the cover stock composition is preferably conducted at least a temperature which allows the complex to release the polyamine compound. In other words, the curing is conducted at the temperature higher than the temperature where mixing is conducted, preferably over 60° C., more preferably from 65° C. to 120° C., more preferably to 100° C. If the curing is conducted at a temperature higher than 120° C., the rubber core or the rubber thread layer is deteriorated by heat, resulting in a golf ball having an inferior impact resilience and exhibiting lower flying performance.

The curing time of the cover stock composition depends on the curing temperature. Since the released polyamine compound is highly reactive with the isocyanate group, it is possible to shorten the curing time preferably up to 15 minutes, more preferably up to 10 minutes.

According to the present invention, the productivity is improved because of the short curing time. As required, the surface of the cover is formed with dimples in the curing process.

Further, the golf ball is provided with a marking stamp, paint finishing and the like after the formation of the cover to enhance the appearance and commercial value thereof and is then put on the market.

The present invention also includes a golf ball which comprises a core and a polyurethane cover covering the core. The polyurethane cover is characterized in being formed by curing the foregoing cover stock composition.

Preferably, the golf ball of the present invention is manufactured by the process of the present invention. The golf ball manufactured by the process of the invention exhibits an excellent impact resilience because the core is not deteriorated by heat for curing.

EXAMPLES

The following examples illustrate the present invention, however these examples are intended to illustrate the invention and are not to be construed to limit the scope of the invention. Many variations and modifications of such examples will exist without departing from the scope of the inventions. Such variations and modifications are intended to be within the scope of the invention.

Evaluation Method (1) Measurement of Hardness (JIS-A-hardness) of Golf Ball

The hardness of a golf ball was measured by bringing a spring type hardness tester A prescribed by JIS-K6301 into contact with a surface of the golf ball.

(2) Repulsion Coefficient of Golf Ball

An aluminum cylindrical body having a weight of 200 g was allowed to collide with a stationary golf ball at a velocity of 45 m/sec. The repulsion coefficient was determined by measuring the respective velocities of the cylindrical body and the golf ball before and after the collision. The average of the measured values was calculated with respect to each set of 12 golf balls and assumed as the value with respect to each set of golf balls. The repulsion coefficient was shown as an indexed value relative to the value of comparative example 2 being assumed 100. A greater index is indicative of a larger repulsion force.

(3) Travel Distance of a Golf Ball

A golf ball was hit with a metal head driver (W#1) attached to a swing robot manufactured by TRUETEMPER CO.Ltd at the head speed of 45 m/sec., and the distance from the hit point to the dropped point was measured.

(4) Workability

Workability in the manufacture of a golf ball was judged on the following criteria:

Good: Mixing was easy because mixing was conducted at 60° C. or lower, and the workability was satisfactory because viscosity of the cover stock composition did not increase due to the curing reaction during mixing, and the curing reaction after mixing was completed in a short time.

Poor: There arose any one of the problems that mixing was difficult because the mixing had to be conducted at the temperature higher than 60° C., the viscosity of the cover stock composition increased due to the curing reaction during mixing, or a longer curing time was required.

Manufacture of Golf Ball (1) Manufacture of Core

A core composition shown in Table 1 was kneaded and then compression molded in a mold at 160° C. for 15 minutes to form a core.

TABLE 1

| Raw materials | Parts |
| --- | --- |
| BR11 | 100 |
| Zinc acrylate | 28 |
| Dicumyl Peroxide | 1.5 |
| Zinc Oxide | 10 |
| Barium Surfate | 20 |
| Nocrack NS-6 | 0.5 |

Notes on table:
BR11: Butadiene rubber(NIPPON GOUSEIGOMU)
Nocrak NS-6: Antioxidant(OOUCHI SHINKOKAGAKUKOGYO)

(2) Manufacture of a Wound Core

Thread of a blended rubber comprising natural rubber/low-cis-isoprene rubber ("Shell IR-309" produced by Shell Kagaku) at a mass ratio of 50/50 as a basic rubber was wound about the aforementioned core to form a wound core having an outer diameter of about 39.0 mm.

(3) Manufacture of Cover

According to the mixing formulation shown in Table 2, an isocyanate group terminated polyurethane prepolymer and a curing agent were mixed together to obtain a cover stock composition.

TABLE 2

| Raw materials | Ex 1 | Com. Ex 1 | Com. Ex 2 |
| --- | --- | --- | --- |
| Cornate 4095 | 100 | 100 | 100 |
| Cature 21 | 31 | — | — |
| Iharacuamine MT | — | 17.5 | — |
| Polamine 250 | — | — | 33.9 |
| Titanium Oxide | 2 | 2 | 2 |

Note on table:
Cornate 4095: Isocyanate terminated polyurethane prepolymer made from toluene diisocyanate and polyoxytetramethylene glycol(PTMG) produced by Nippon Polyurethane.
Cature 21: 50% dioctyl phthalate dispersion of the complex of methylene dianiline(MDA) and sodium chloride(MDA:Nacl = 3:1 in molar ratio) produced by Uniroyal.
Iharacuamine MT: 3,3'-dichloro-4,4'-diaminodiphenylmethane produced by Ihara Chemical Kougyou.
Polamine 250: polytetramethyleneoxide-di-P-aminobenzoate, which is equivalent to the diamine-type curing agent having low reactivity disclosed in Japanese Examined Patent Application No. 2,662,909.

The cover stock composition was cured on the conditions shown in Table 3. The formed golf ball was removed from the mold, deburred, and then coated with a white paint and a clear paint, to obtain a golf ball having a diameter of 42.8 mm and a weight of 45.4 g.

The obtained golf ball was evaluated with respect to the workability and the physical properties, according to the measurement and evaluation method described above. The results were also shown in Table 3.

TABLE 3

| Evaluation | Ex. 1 | Com. Ex 1 | Com. Ex. 2 |
| --- | --- | --- | --- |
| Mixing temp. (° C.) | 30 | 80 | 40 |
| Curing temp. (° C.) | 120 | 120 | 120 |
| Curing time (min.) | 5 | 10 | 30 |
| Increase in Viscosity | None | Observed | None |
| Workability | Good | Poor | Poor |
| JIS-A-hardness | 92 | 94 | 96 |
| Repulsive Coefficient | 100 | 100 | 98 |
| distance (yards) | 232 | 232 | 230 |

As seen from Table 3, an increase in viscosity during mixing the cover stock composition was prohibited in example 1. This is because mixing was carried out at 30° C. where the complex does not release the polyamine compound. Further a curing time was as short as five minutes, thereby improving the productivity. The obtained golf ball exhibited the same performance as those of a conventional golf ball without any inferiority.

In comparative Example 1, Iharacuamine MT was used as an amine-type curing agent, which is a general-purpose diamine curing agent conventionally used for polyurethane prepolymer and is highly reactive with an isocyanate group. Since Iharacuamine MT has a melting point of about 100° C., the mixing temperature had to be raised to 80° C. or higher in order to disperse Iharacuamine MT homogeneously into Coronate 4095. Mixing the cover stock composition at 80° C. promoted the reactivity of Iharacuamine MT with the isocyanate group, hence the viscosity of the cover stock composition increased. As a result, workability was lowered.

In comparative Example 2, Polamine 250 was used, which is an amine-type curing agent having low reactivity, the required curing time was as long as 30 minutes, thus productivity was lowered.

The process of the present invention is capable of controlling the curing reaction during mixing the polyurethane cover stock composition as well as mixing the cover stock composition about room temperature, thereby ensuring excellent workability. Further, since curing can be conducted at the temperature over 60 to 120° C., preferably from 65 to 100° C., where the complex release the polyamine compound, the golf ball can be produced without heat-deteriorating the core in the curing process.

This application is based on Japanese Patent application No.2000-205400 filed on Jul. 6, 2000, the contents of which are hereby incorporated by reference.

What is claimed is:

1. A process for manufacturing a golf ball having a core and a cover coating the core, comprising coating the core with a composition including a complex of a polyamine compound with a metal salt, and an isocyanate group terminated polyurethane prepolymer; and curing the composition to form the cover.

2. The process according to claim 1, wherein the polyamine compound is methylene dianiline or a derivative thereof; and the metal salt is sodium chloride or lithium chloride.

3. The process according to claim 2, wherein the complex is dispersed in a plasticizer.

4. The process according to claim 1, wherein the curing is conducted by heating the composition at least a temperature which allows the complex to release the polyamine compound.

5. The process according to claim 4, wherein the polyamine compound is methylene dianiline or a derivative thereof;

the metal salt is sodium chloride or lithium chloride; and the complex is dispersed in a plasticizer.

6. The process according to claim 5, wherein the complex is a complex of methylene dianiline with sodium chloride and dispersed in dioctyl phthalate.

7. The process according to claim 6, wherein the isocyanate terminated polyurethane prepolymer is made from toluene diisocyanate and polyetherpolyol.

8. The process according to claim 1, further comprising mixing the isocyanate group terminated polyurethane prepolymer and the complex to obtain the composition.

9. The process according to claim 8, wherein the mixing is conducted below a temperature which allows the complex to release the polyamine compound.

10. The process according to claim 9, wherein the curing is conducted at least a temperature which allows the complex to release the polyamine compound.

11. The process according to claim 10, wherein the complex is a complex of methylene dianiline with sodium chloride and dispersed in dioctyl phthalate.

12. The process according to claim 11, wherein the isocyanate terminated polyurethane prepolymer is made from toluene diisocyanate and polyetherpolyol.

13. The process according to claim 12, wherein the mixing is conducted not higher than 60° C. and the curing is conducted over 60 to 120° C.

14. A golf ball comprising a core and a polyurethane cover coating the core, wherein the polyurethane cover is formed by curing a composition including an isocyanate group terminated polyurethane prepolymer; and a complex of a polyamine compound with a metal salt.

15. The golf ball according to claim 14, wherein the isocyanate group terminated polyurethane prepolymer is a polyether polyurethane prepolymer.

16. The golf ball according to claim 14, wherein the polyamine compound is methylene dianiline or a derivative thereof.

17. The golf ball according to claim 14, wherein the metal salt is sodium chloride or lithium chloride.

18. The golf ball according to claim 14, wherein the complex is dispersed in a plasticizer.

19. The golf ball according to claim 18, wherein the polyamine compound is methylene dianiline or a derivative thereof; and the metal salt is sodium chloride or lithium chloride.

20. The golf ball according to claim 19, wherein the isocyanate terminated polyurethane prepolymer is made from toluene diisocyanate and polyetherpolyol; and the complex is a complex of methylene dianiline with sodium chloride and dispersed in dioctyl phthalate.

* * * * *